United States Patent
McConnell

(10) Patent No.: US 10,741,063 B2
(45) Date of Patent: Aug. 11, 2020

(54) TRAFFIC METERING SYSTEM

(71) Applicant: Roderick McConnell, Munich (DE)

(72) Inventor: Roderick McConnell, Munich (DE)

( * ) Notice: Subject to any disclaimer, the term of this patent is extended or adjusted under 35 U.S.C. 154(b) by 193 days.

(21) Appl. No.: 15/898,589

(22) Filed: Feb. 18, 2018

(65) Prior Publication Data

US 2019/0259273 A1 Aug. 22, 2019

(51) Int. Cl.
| | |
|---|---|
| G08G 1/01 | (2006.01) |
| G08G 1/127 | (2006.01) |
| H04W 4/44 | (2018.01) |

(52) U.S. Cl.
CPC ......... *G08G 1/0145* (2013.01); *G08G 1/0112* (2013.01); *G08G 1/127* (2013.01); *H04W 4/44* (2018.02)

(58) Field of Classification Search
CPC .... G08G 1/0145; G08G 1/0112; G08G 1/127; H04W 4/44
See application file for complete search history.

(56) References Cited

U.S. PATENT DOCUMENTS

| | | | | |
|---|---|---|---|---|
| 8,723,687 B2* | 5/2014 | Thomas | ........... | G08G 1/096716 340/905 |
| 2003/0189498 A1* | 10/2003 | Kakihara | ........... | G06Q 30/0284 340/928 |
| 2011/0178702 A1* | 7/2011 | Lassesson | ........... | G01C 21/34 701/408 |
| 2012/0158299 A1* | 6/2012 | Cerecke | ........... | G01C 21/3446 701/533 |
| 2012/0215594 A1* | 8/2012 | Gravelle | ........... | G07B 15/02 705/13 |
| 2014/0122032 A1* | 5/2014 | Zou | ........... | G06N 3/126 703/2 |
| 2014/0278052 A1* | 9/2014 | Slavin | ........... | G01C 21/3492 701/400 |
| 2018/0336780 A1* | 11/2018 | Ran | ........... | G08G 1/0145 |

FOREIGN PATENT DOCUMENTS

| | | | | |
|---|---|---|---|---|
| EP | 1202233 A1 * | 5/2002 | ............... | G08G 1/09 |
| WO | WO-2018000313 A1 * | 1/2018 | ............. | G06Q 10/02 |

* cited by examiner

*Primary Examiner* — Yazan A Soofi

(57) ABSTRACT

A traffic metering system for metering access to at least one metered segment, configured to receive requests from one or more vehicles announcing a destination and a requested arrival time, and to authorize the vehicles to enter a metered segment based on a schedule for the at least one metered segment. Vehicles configured for use in the metering network announce a request for destination and arrival time to the metering network and the metering network authorizes the vehicle to enter the metered segment based on a schedule for the at least one metered segment.

20 Claims, 2 Drawing Sheets

TRAFFIC METERING SYSTEM

Traffic metering is used to improve traffic flow, especially on heavily travelled routes. The number of vehicles permitted to enter a certain segment of a route is limited. Vehicles which wish to enter the route are delayed, but the overall flow of traffice is improved. The overall optimization goal is to allow the large majority of vehicles to reach their destination faster.

Metering is typically performed with traffic lights or other signals, which signal when a vehicle is allowed to enter a heavily travelled route. For example the traffic light may be set at the entrance ramp of a highway. The traffic light may show one green light per cycle, authorizing one vehicle to enter a segment of a heavily travelled route, and otherwise a red light, meaning that vehicles are not authorized to enter.

Other systems with a similar function exist, such as toll roads with varying rates at different times of day, and tolls for entering a restricted area, such as when entering the London Congestion Charge Zone.

With the advent of networked and autonomous vehicles, it may be advantageous to replace or augment on-site meters with networked metering, that authorizes access to certain segments of routes in advance of entering the segment of the heavily travelled route, and even before starting a journey. A central coordinator receives requests for vehicles with their destination and desired travel time, and authorizes a departure time for a vehicle.

Early authorization has the advantage of avoiding delays at the entrance to heavily travelled routes. Authorization before departure means that vehicles will not unnecessarily be en route, if they will have to wait for access to a metered segment. Early authorization can also be combined with aspects such as predictions of traffic patterns, announced destinations of other vehicles, and scheduling and fee schemes.

DETAILED DESCRIPTION

Figure 1:
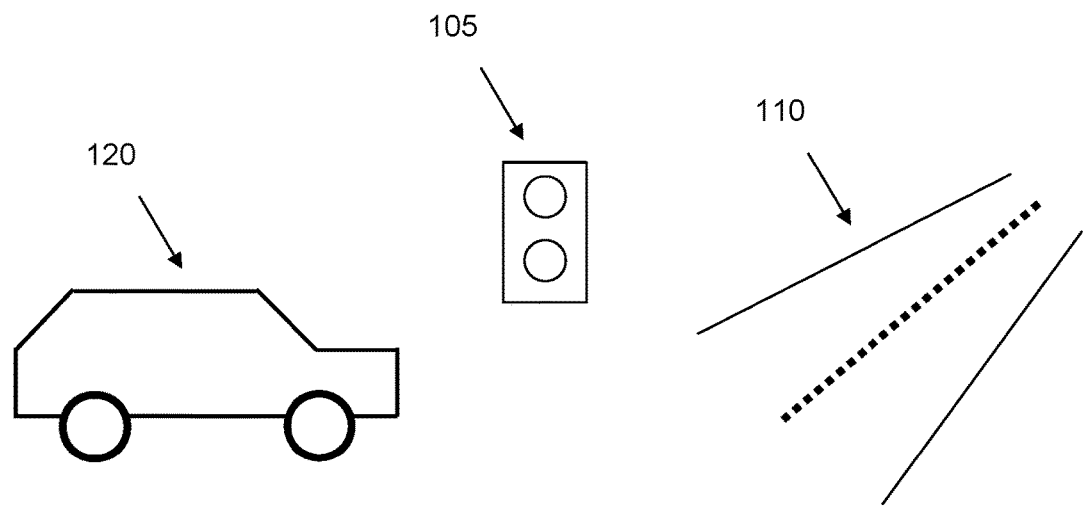
FIG. 1 shows a metering system using a traffic light.

FIG. 1 shows a metering traffic light 105 as is seen at the entrance to a highway 110 in urban areas. This metering system meters the arrival of vehicles 120 on the entrance ramp of the highway, in order to avoid traffic slow-downs which occur when many vehicles enter simultaneously on the highway. The metering system authorizes each vehicle to enter a metered segment with a green light.

Metering the vehicles, so that only a limited number of vehicles enters and at regular intervals, leads to a better traffic flow on the highway. Networked vehicles may use alternative signalling, such as a network formed by radio or wireless connections, in order to exchange metering signals and be authorized to enter a metered segment. Networked systems and stand-alone systems such as in FIG. 1 may also be combined.

Figure 2:
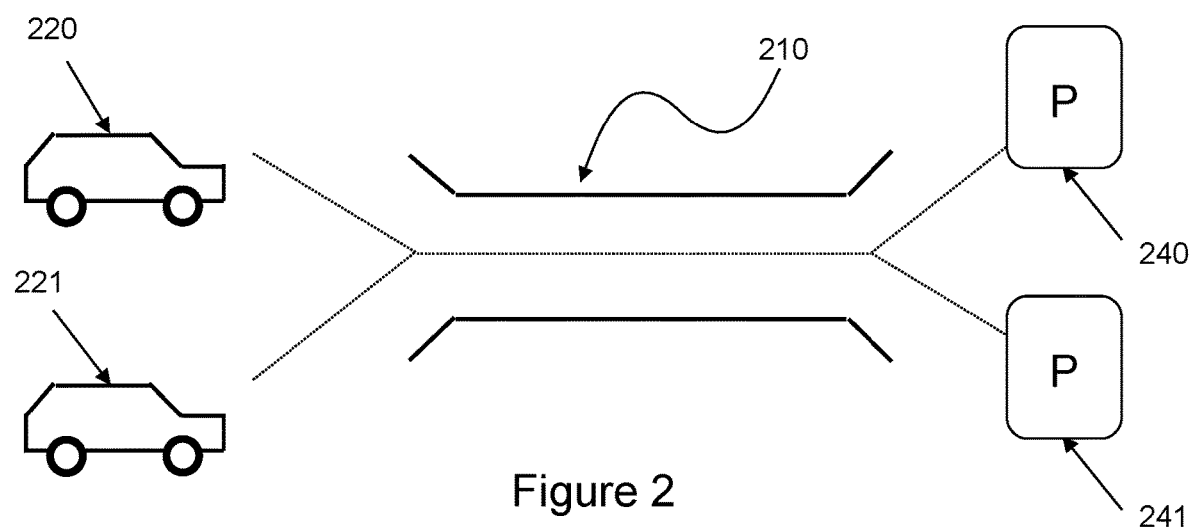
FIG. 2 shows a route with a metered segment.

FIG. 2 shows routes with a metered segment 210, and vehicles 220, 221 which converge on the metered segment. After passing through the metered segment, each vehicle will proceed to a separate destination 240, 241. The vehicles may be authorized by the metering system of FIG. 1, or a networked metering system, or a combination of both, to enter the metered segment. Both vehicles have a route to the announced destination which passes through the metered segment. After passing through the metered segment, the vehicles proceed to announced destinations as parking 240, 241. Vehicles may pass through multiple metered segments en route to their respective destinations. There may also be a mix of vehicles which enter a metered segment, some which enter with authorization from a metering system, and others which do not need authorization from a metering system. As an example, vehicles already on a highway may not need authorization, but vehicles entering a highway do need authorization.

Figure 3:
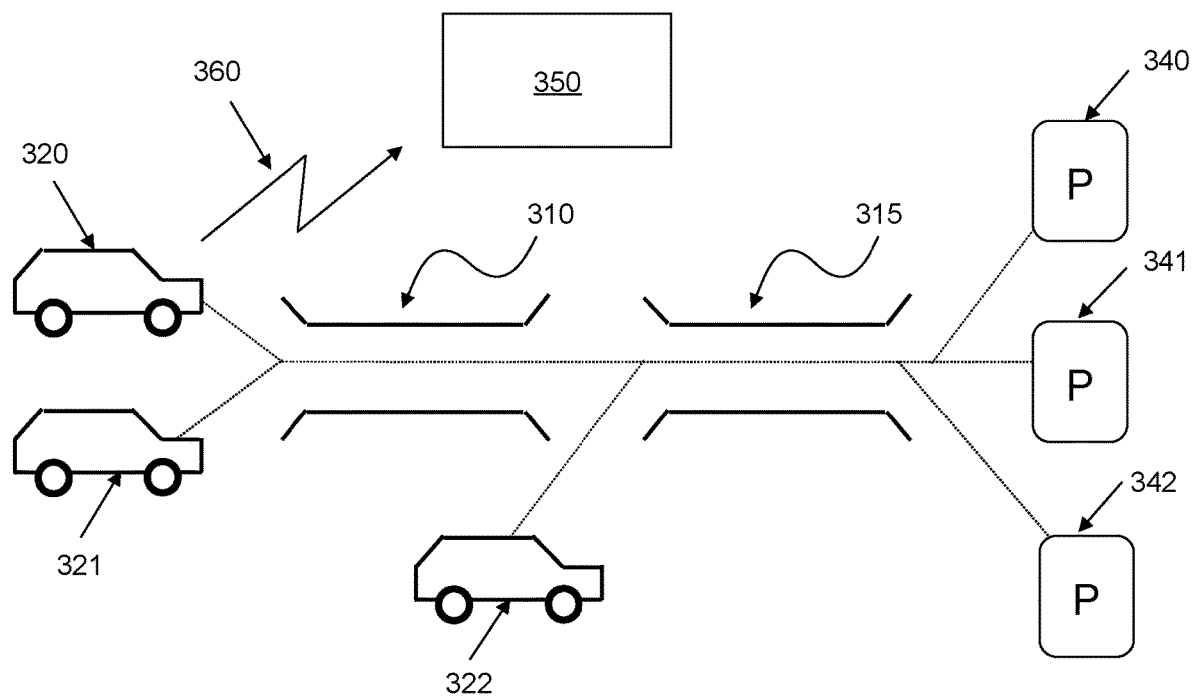
FIG. 3 shows a route with multiple metered segments.

FIG. 3 shows a route with multiple metered segments. Some vehicles 320, 321 converge on a first metered segment 310. Other vehicles 322 arrive only at a second metered segment 315. After passing one or more metered segments, the vehicles proceed to their respective destinations, here as parking 340, 341, 342. The route of each vehicle passes through at least one metered segment.

Metering for some vehicles may occur over wireless connections 360, over which an announcement request is sent and an authorization returned. In some embodiments, the wireless connection may be realized by equipment installed in the vehicle, or with User Equipment UE such as a mobile phone. The UE may not be an integral part of the vehicle, but rather be associated with the vehicle, such that the metering network can recognize the association. The UE may be associated with the vehicle by being in the vehicle. The UE may be associated with the vehicle by the license plate number of the vehicle.

Figure 4:
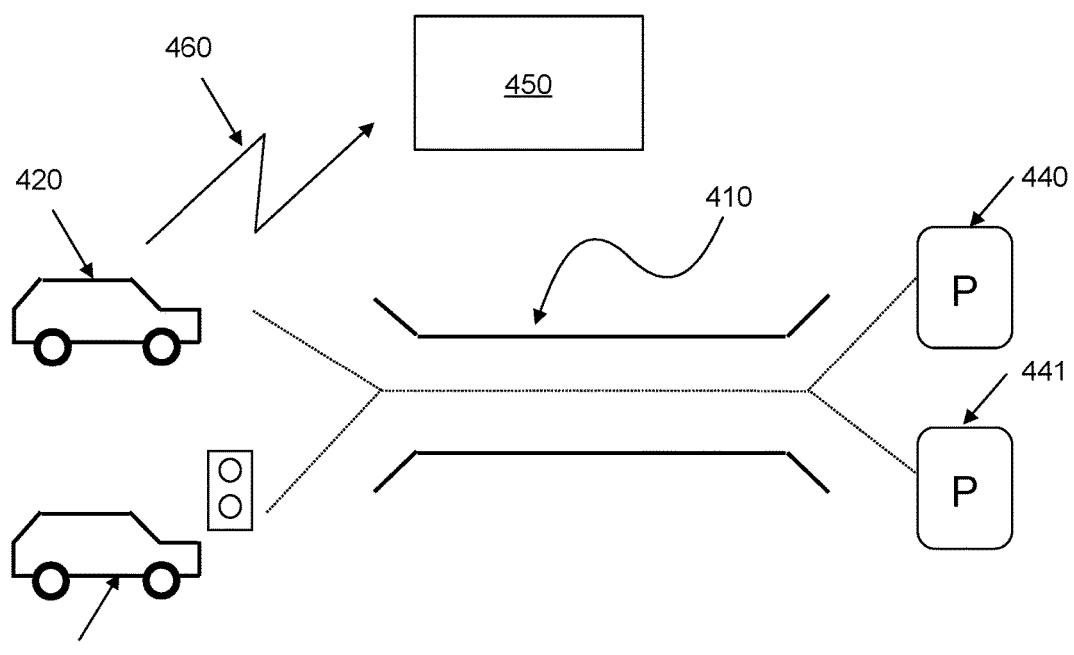
FIG. 4 shows a metering coordinator.

The metering may be based on authorizing a time or timeslot for the vehicle to start its journey, as in FIG. 4. The vehicle 420 may first announce its destination as a request to a central coordinator 450. The announcement may be a request to arrive at a certain destination and at a certain time, using a route which passes through a metered segment 410. The central coordinator may receive announcements for multiple vehicles 421, 422. The central coordinator may gather requests from multiple vehicles 420, 421 and form a schedule for use of metered segment 410. The schedule may be determined based on announced destinations, past traffic patterns, and/or current traffic information. After passing one or more metered segments, the vehicles proceed to their announced respective destinations, here as parking 440, 441.

Metering for some vehicles may occur over wireless connections 460, over which an announcement request is sent and an authorization returned. Metering for other vehicles may occur using the metering system of FIG. 1. Different metering systems may co-exist. Vehicles which do not use the wireless connection may use other methods to announce their request for a destination and arrival time. For example, vehicles may have a regularly scheduled destination and arrival time. Or vehicles may not announce their destination or not announce a desired arrival time, or both.

Determining the schedule may use calendar considerations such as the day of the week, holidays, special events, etc. Determining the schedule may be done for a single request. Determining the schedule may be done for a group of requests. Requests may be grouped over a period of time, or with another criteria. Requests may be grouped for a desired arrival time at the destination, or for use of a metered segment. All vehicles from a group of requests may get an authorization, or only some vehicles from a group of request may get an authorization.

A vehicle which does not get an authorization for a requested arrival time may get an authorization for a different arrival time, or may have to request again, e.g. for a different arrival time.

The schedule may be determined based in part on past traffic patterns. The schedule may be determined based in part on past patterns by calendar events or days. The schedule may be determined in part based on estimations of traffic for when the requesting vehicle is in the metered segment, or arrives at the metered segment.

The vehicle may announcement a request to arrive at a certain destination and at a certain time according to a periodic or recurring pattern. For example, the request might be for workdays, or Sundays, or certain days of the week. The request may also be a single non-recurring request.

The authorization to enter a metered segment may be received by vehicles 420, 421 before departure. The authorization may authorize the departure, or it may recommend a departure time. The vehicle may depart at the departure time in the authorization. The vehicle may depart before the departure time in the authorization. There may be a penalty or a delay for vehicles which do not depart at the departure time of the authorization. Vehicles which depart after the time of the authorization may have to wait to enter the metered segment.

A central scheduler may perform scheduling as each request arrives for non-recurring requests. The central scheduler may schedule according to periodic or recurring requests at a fixed time. The fixed time may recur on a daily or weekly basis.

Data protection and privacy may be a concern. The vehicle may wish to announce a request without letting outside observers know the destination and desired arrival time. The request may be sent using crypographic methods. The request may be coded using symmetric keys. The request may be coded using public/private keys. The request with an announcement of desired arrival time at the destination may anonymized at a central scheduler. The request may be anonymized before estimating traffic patterns, or doing statistical analysis of requested destinations and arrival times of multiple vehicles. The vehicle may exchange keys with the central scheduler before announcing a request. The vehicle may exchange keys with the central scheduler once for multiple requests.

A central scheduler may receive multiple requests and use statistical techniques to estimate traffic patterns without identifying individual vehicles. The central scheduler may exchange keys with the vehicles before sending an authorization, or before receiving a request.

The authorization for a requested announcement of a desired arrival time at a destination may be determined in conjunction with a privilege level of the vehicle. A vehicle may have a privilege level based on the number of occupants. A vehicle with three occupants may have a higher privilege level than a vehicle with two occupants. A vehicle with two occupants may have a higher privilege level than a vehicle with one occupant. A vehicle may have a privilege level based on a criteria linked to the destination, or linked to the location from which it leaves. A vehicle may have a privilege level based on its function, such as an ambulance or a school bus. A vehicle may have a privilege level based on an occupant, such as a person who enjoys a higher privilege for his or her travel. The privilege level may be based on a political function. The privilege level may be based at least in part on a combination of any or all of the above factors.

The privilege level may be based wholly or in part on fees. The authorization for a destination at a requested time may depend on paying a certain fee for a given destination, or a certain fee for a requested time, or a combination of these and other factors. The fee may vary by time of day, or by day of the week. The fee may vary depending on where the destination is, or e.g. a zone in which a destination is. The fee may vary by starting point. The fees may vary by subscription, where the fee for multiple authorizations is paid at one time.

A central scheduler may consider multiple requests which announce a desired destination in order to determine the fee. The central scheduler may consider all known requests in order to determine the fee. The central scheduler may estimate traffic patterns in order to determine the fee.

The central scheduler may propose alternatives to the desired destination and arrival time. In particular the scheduler may propose multiple arrival times at multiple fee rates. The fee for authorization to arrive at 7 am may be less than the fee for arrival at 9 am. The scheduler may make this information available to the vehicle before authorization. The scheduler may await a choice or even a payment before authorization.

The central scheduler may propose alternative departure times and corresponding alternative arrival times. The alternatives may be proposed in conjuction with fees corresponding to the departure and arrival times. The scheduler may also propose alternative departure times and corresponding alternative arrival times corresponding to a route which passes through a different metered segment or segments, or does not pass through a metered segment.

The central scheduler is a reference to a unitary concept for a network. It need not be a single physical entity, but functions as a unitary element within the network.

I claim:

1. A traffic metering system for metering access to at least one metered segment, configured to receive requests from one or more vehicles announcing a destination and a requested arrival time, wherein each vehicle will first announce its destination as a request to a central coordinator, and wherein the announcement is a request to arrive at a certain destination and at a certain time, and wherein the system is configured to authorize the vehicles to enter a metered segment based on a schedule for the at least one metered segment.

2. The system of the previous claim wherein the authorization comprises a departure time.

3. The system of claim 1 wherein the schedule is determined based on the announced destinations and the announced arrival times.

4. The system of claim 3 wherein a vehicle which does not get an authorization for a requested arrival time will get an authorization for a different arrival time, or will have to request again for a different arrival time.

5. The system of claim 1 wherein the request is coded using public/private keys.

6. The system of claim 5 wherein the schedule is determined based at least in part on factors comprising at least one of past traffic patterns, or current traffic information.

7. A vehicle configured for use in a metering network, wherein the vehicle will pass a metered segment to arrive at a destination, wherein the vehicle anounces a request for destination and arrival time to the metering network, wherein the vehicle will first announce its destination as a request to a central coordinator, and wherein the announcement is a request to arrive at a certain destination and at a certain time, and the metering network authorizes the vehicle to enter the metered segment based on a schedule for the at least one metered segment.

8. The vehicle of claim 7 wherein the vehicle announces and the network authorizes via a wireless connection, and wherein the request is coded using public/private keys.

9. The vehicle of claim 7 wherein the vehicle has a privilege level, and the authorization is determined based at least in part on the privilege level.

10. The vehicle of claim 9 wherein the vehicle has a privilege level based on the number of occupants.

11. The vehicle of claim 9 wherein the vehicle has a privilege level based on a criteria linked to the destination, or linked to the location from which it leaves.

12. The vehicle of claim 9 wherein the privilege level is based on fees.

13. The vehicle of claim 9 wherein the authorization for a destination at a requested time may depend on paying a certain fee for a given destination and, a requested time.

14. A method of scheduling a metered segment, wherein one or more vehicles anounce a request for a destination and arrival time, where each vehicle will pass through at least one metered segment to arrive at the destination, wherein each vehicle will first announce its destination as a request to a central coordinator, and wherein the announcement is a request to arrive at a certain destination and at a certain time, and where each vehicle is authorized to enter the metered segment based on a schedule for the at least one metered segment.

15. The method of claim 14 wherein the authorization to enter comprises a time to depart.

16. The method of claim 14 wherein the authorization to enter is determined in conjunction with a privilege level of the vehicle, and the privilege level corresponds at least in part to a fee.

17. The method of claim 16 wherein the fee varies by time of day or by day of the week.

18. The method of claim 17 wherein the fee varies by destination and the authorization for a destination at a requested time may depend on paying a certain fee for a given destination and for a requested time.

19. The method of claim 17 wherein the fee varies by starting point.

20. The method of claim 14 wherein the vehicle announces and the network authorizes via a wireless connection, and wherein the request is coded using public/private keys.

* * * * *